(12) United States Patent
Iwabuchi et al.

(10) Patent No.: US 7,013,543 B2
(45) Date of Patent: Mar. 21, 2006

(54) VERTICAL MACHINING CENTER

(75) Inventors: Naoki Iwabuchi, Nara (JP); Hajime Kimura, Nara (JP); Ryuichi Fujiwara, Nara (JP)

(73) Assignee: Mori Seiki Hitech Co., Ltd., Yamatokoriyama (JP)

( * ) Notice: Subject to any disclaimer, the term of this patent is extended or adjusted under 35 U.S.C. 154(b) by 183 days.

(21) Appl. No.: 10/690,826

(22) Filed: Oct. 23, 2003

(65) Prior Publication Data

US 2004/0111850 A1   Jun. 17, 2004

(30) Foreign Application Priority Data

Nov. 13, 2002 (JP) ............................. 2002-329630

(51) Int. Cl.
  *B23Q 7/04*  (2006.01)
  *B23Q 7/10*  (2006.01)
(52) U.S. Cl. .................. 29/27 C; 409/159; 82/122; 82/125
(58) Field of Classification Search ............... 29/26 A, 29/26 R, 27 C, 27 R, 33 R; 409/145, 148, 409/159, 160, 163, 164; 82/122, 125, 124, 82/126
See application file for complete search history.

(56) References Cited

U.S. PATENT DOCUMENTS 6,131,259 A    10/2000  Stark et al.
6,394,716 B1 *  5/2002  Huber et al. .................. 409/26

FOREIGN PATENT DOCUMENTS

JP          07237077 A *  9/1995

* cited by examiner

*Primary Examiner*—Boyer D. Ashley
*Assistant Examiner*—Dana Ross
(74) *Attorney, Agent, or Firm*—Armstrong, Kratz, Quintos, Hanson & Brooks, LLP

(57) ABSTRACT

In a vertical machining center, a spindle head is movable in three mutually transverse axes directions relative to a workpiece and a table is arranged below. A vertical stocker is disposed in the vicinity of a machining area and stocks the bar workpiece in a vertical direction. A hand portion which grips and releases the bar workpiece is provided on the spindle head. The spindle head moves between the stocker and the table so that the hand portion transfers the bar workpiece and performs putting and removing the bar workpiece to the stocker and a chuck of the table, respectively.

14 Claims, 4 Drawing Sheets

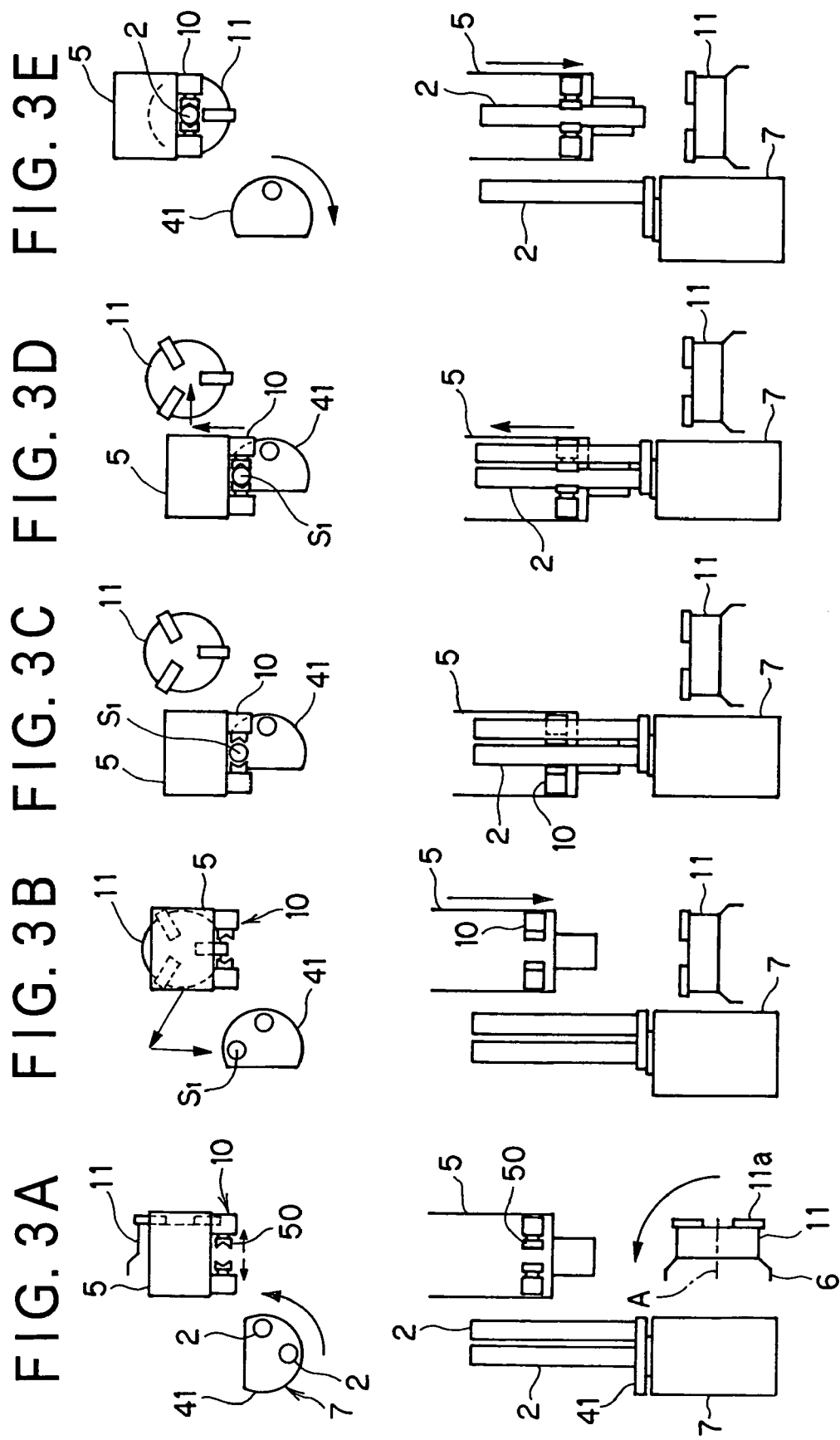

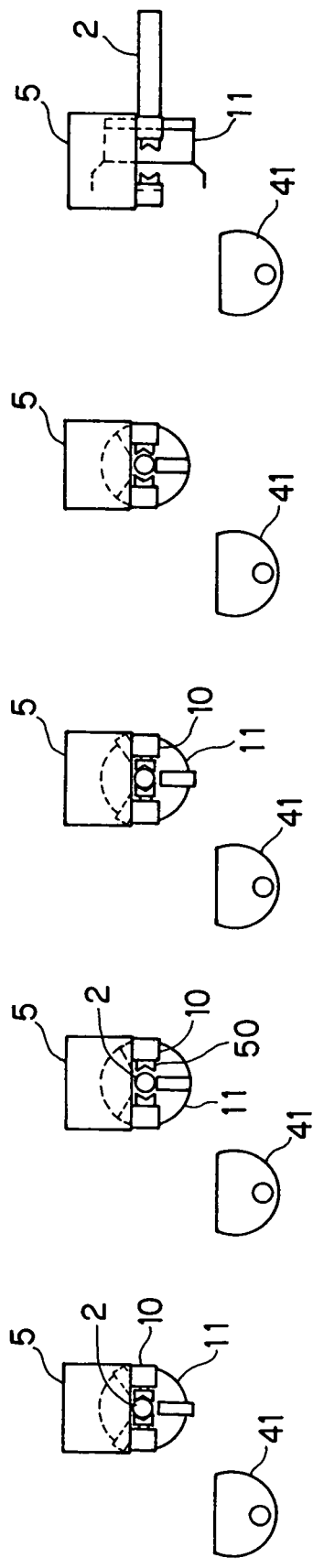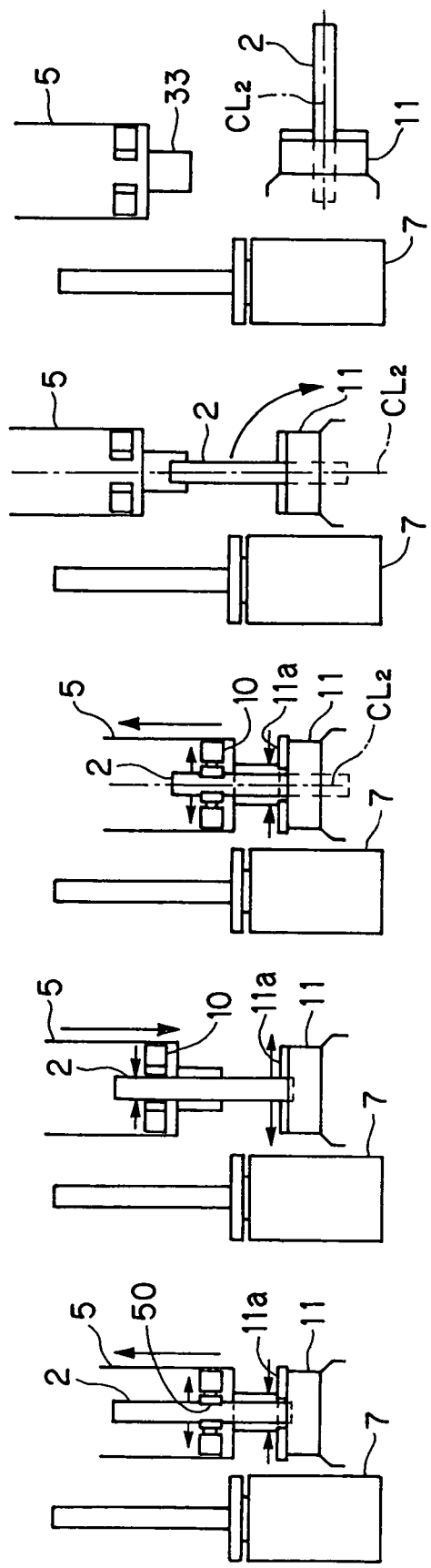

VERTICAL MACHINING CENTER

BACKGROUND OF THE INVENTION

1. Field of the Invention

The present invention relates to a vertical machining center which may machine a bar workpiece.

2. Description of the Related Art

An axis of a main spindle of a vertical machining center is directed in the vertical direction. A bar workpiece (i.e., a bar member or a bar work) having an axial dimension longer than a radial dimension is a kind of workpiece. A technology, in which a bar workpiece is fed by a bar feed device (a bar workpiece feeding device) to perform a turning by a turning tool and to perform a cutting by a rotating tool to the bar workpiece, is known in the vertical machining center.

Also, the U.S. Pat. No. 6,131,259 discloses a technology relating to a vertical machining center provided with a bar member feeding device (bar feed device).

This vertical machining center has a horizontal bar member feed device for arranging the bar workpiece in the horizontal direction. The bar member (bar workpiece) is fed to the vertical machining center by this bar member feed device. The bar member feed device is adapted to push and feed the bar member by a clamping unit, and is movable to a position at which the feed device does not interrupt a swinging motion of the bar member.

However, in the vertical machining center described in the above-described U.S. Pat. No. 6,131,259, it is necessary to provide the bar member feeding device which is movable and pushes the bar member. As a result, the overall structure of the device becomes complicated.

Also, because the bar member feeding device is provided separately from the vertical machining center and is arranged in the horizontal direction, the bar member feeding device is projected considerably in plan view outwardly from a body of the vertical machining center. For this reason, a space in plan view which is required to arrange the overall vertical machining center including the bar member feeding device is expanded.

SUMMARY OF THE INVENTION

Accordingly, in order to overcome the above-noted defects, an object of the present invention is to provide a space-saving vertical machining center which may perform to stock, feed and machine bar workpieces even without providing a feeding device having a complicated structure for pushing the bar workpiece.

In order to attain this and other objects of the invention, according to the present invention, there is provided a vertical machining center having a table arranged below and a spindle head being movable in three mutually transverse axes directions relative to a workpiece, the vertical machining center comprising: a vertical stocker, which is disposed in the vicinity of a machining area, for stocking a bar workpiece in a vertical direction; and the spindle head provided with a hand portion which grips and releases the bar workpiece, wherein the spindle head moves between the stocker and the table so that the hand portion transfers the bar workpiece and performs putting and removing the bar workpiece to the stocker and a chuck of the table, respectively.

There is provided a five-axis controlling vertical machining center in which an axis of a main spindle rotatably supported by a spindle head is directed in a substantially vertical direction to a floor surface, a table, having a chuck adaptable to be directed upwardly, the table being disposed below a level of the spindle head, the spindle head is movable in three mutually transverse axes directions relative to a workpiece gripped by the chuck, and the table is driven to be swingable and to be also at least rotatable by a table drive unit, the vertical machining center comprising: a vertical stocker, which is disposed in the vicinity of the table, for stocking at least one bar workpiece in a vertical direction; and the spindle head provided with a hand portion which grips and releases the bar workpiece, wherein the spindle head moves between the table and a receiving and discharging position of the stocker so that the hand portion transfers the bar workpiece and performs putting and removing the bar workpiece to the stocker and the chuck of the table, respectively.

Preferably, the table drive unit comprises: a swing drive unit for swinging the table; and a rotational drive unit for rotating the chuck and for indexing the chuck relative to the table, wherein the swing drive unit for supporting both ends of the table in a swingable manner is disposed in front of the vertical machining center, and the table is provided with the rotational drive unit, and the table and the rotational drive unit are swung and indexed at a predetermined position by driving the swing drive unit.

Preferably, when the rotational drive unit is driven while the bar workpiece is turned, the chuck mounted on the table is rotated at predetermined rotational speeds, and while the bar workpiece is cut by a rotating tool, the rotational drive unit is controlled to thereby index the chuck at a predetermined position.

When the swing drive unit is driven, the bar workpiece is indexed under the conditions that the bar workpiece is kept in a slanted direction in addition to the horizontal direction to thereby make it possible to perform various turning and cutting operations in a predetermined desired manner.

Preferably, an insertion hole for inserting the bar workpiece is formed in a central position of the table and the chuck, and the chuck is adapted to grip and release the bar workpiece under the condition that the bar workpiece is inserted into the insertion hole.

Preferably, the stocker stocks a plurality of bar workpieces and is disposed by utilizing an upper space of a base of the vertical machining center or an upper space of the table drive unit so that the bar workpiece is indexed at the receiving and discharging position.

Preferably, the stocker comprises: a stocker body provided with an index drive unit for indexing the bar workpiece at the receiving and discharging position; a swivel portion, for swiveling about a swivel axis, mounted horizontally on an upper portion of the stocker body; and a plurality of receiving sleeves fixed on a top surface of the swivel portion and arranged to be directed upwardly in parallel with the swivel axis, wherein the receiving sleeve is opened upwardly and forms a cylindrical shape or a bottomed cylindrical shape, and the bar workpiece is moved in an up-and-down direction in parallel with the swivel axis so that it is possible to insert the bar workpiece into the receiving sleeve and to remove the bar workpiece out of the receiving sleeve.

Preferably, the swivel portion is composed of a semicircular plate which is cut away linearly leaving a center of the circle, and when the stocker is brought into the standby condition, the index drive unit is driven and then the swivel portion is swiveled about the swivel axis and a linear cutaway surface of the swivel portion is directed in a right-and-left direction so that there is no fear that the spindle head would interfere with the swivel portion, the receiving sleeves and the bar workpieces which are stocked.

Preferably, the index drive unit provided on the stocker body is driven so that the swivel portion is swiveled about the swivel axis, accordingly an empty receiving sleeve or the receiving sleeve, in which the desired bar workpiece is stocked, is indexed at the receiving and discharging position and is positioned in place.

Preferably, at the receiving and discharging position, the hand portion inserts and removes the bar workpiece to the receiving sleeve indexed at the receiving and discharging position, and when the chuck of the table is directed upwardly and the table is indexed and positioned in place, the hand portion inserts the bar workpiece into the insertion hole and draws the bar workpiece out of the insertion hole from above the table.

Preferably, the vertical machining center performs turning and cutting the bar workpiece and a chuck workpiece other than the bar workpiece.

With such an arrangement, according to the present invention, it is possible to provide a space-saving vertical machining center which performs the operations such as stocking, feeding and machining the bar workpiece even without providing a feeding device having a complicated structure for pushing the bar workpieces.

BRIEF DESCRIPTION OF THE DRAWINGS

FIGS. 1 to 3J are views showing an embodiment of the present invention, and FIG. 1 is a perspective view of a vertical machining center.

FIG. 2 is a plan view of the vertical machining center.

FIGS. 3A to 3J are illustrations of the operations of the vertical machining center.

DESCRIPTION OF THE PREFERRED EMBODIMENTS

An embodiment of the present invention will now be described with reference to the accompanying drawings FIGS. 1 to 3J.

Figure 1:
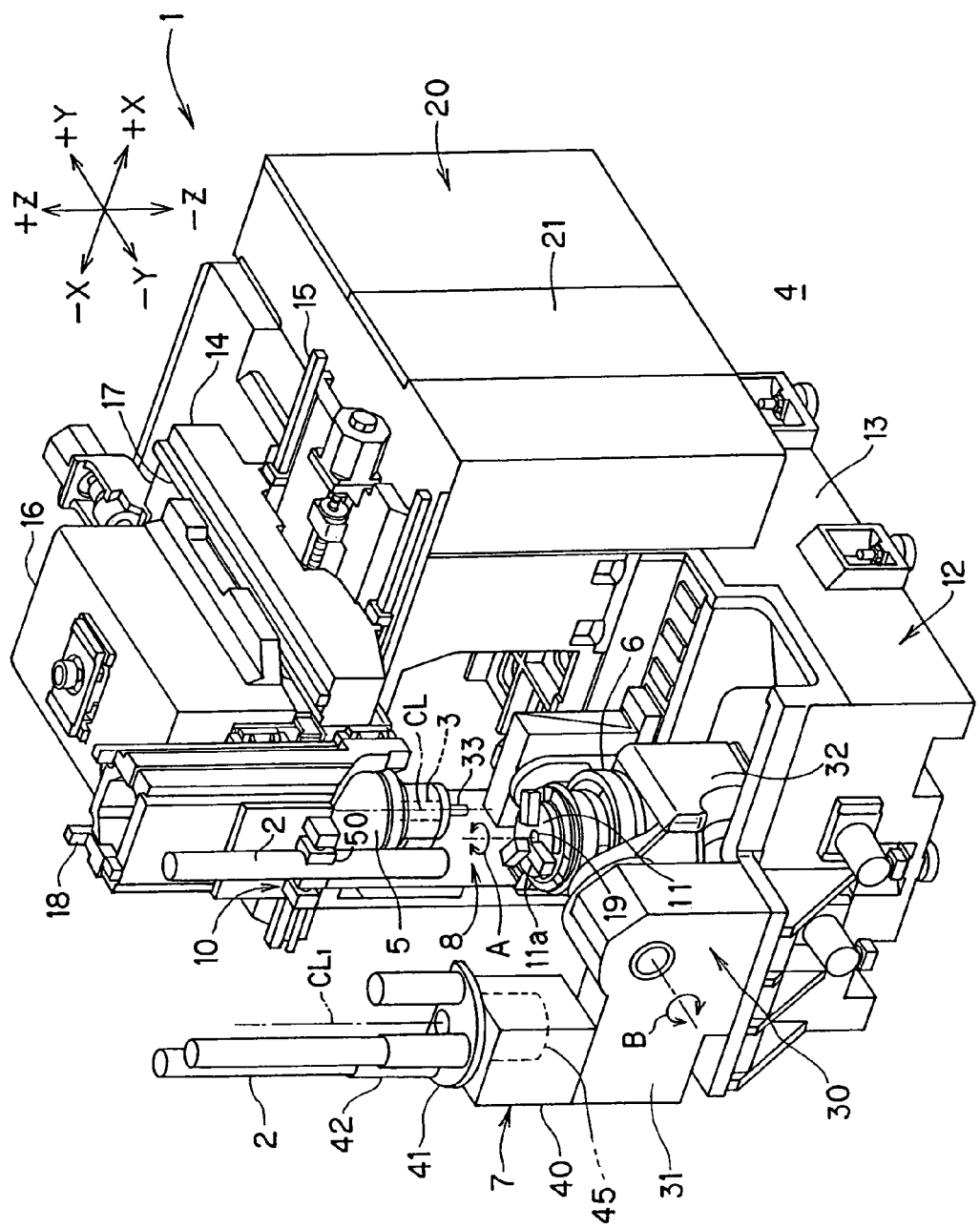
Figure 2:
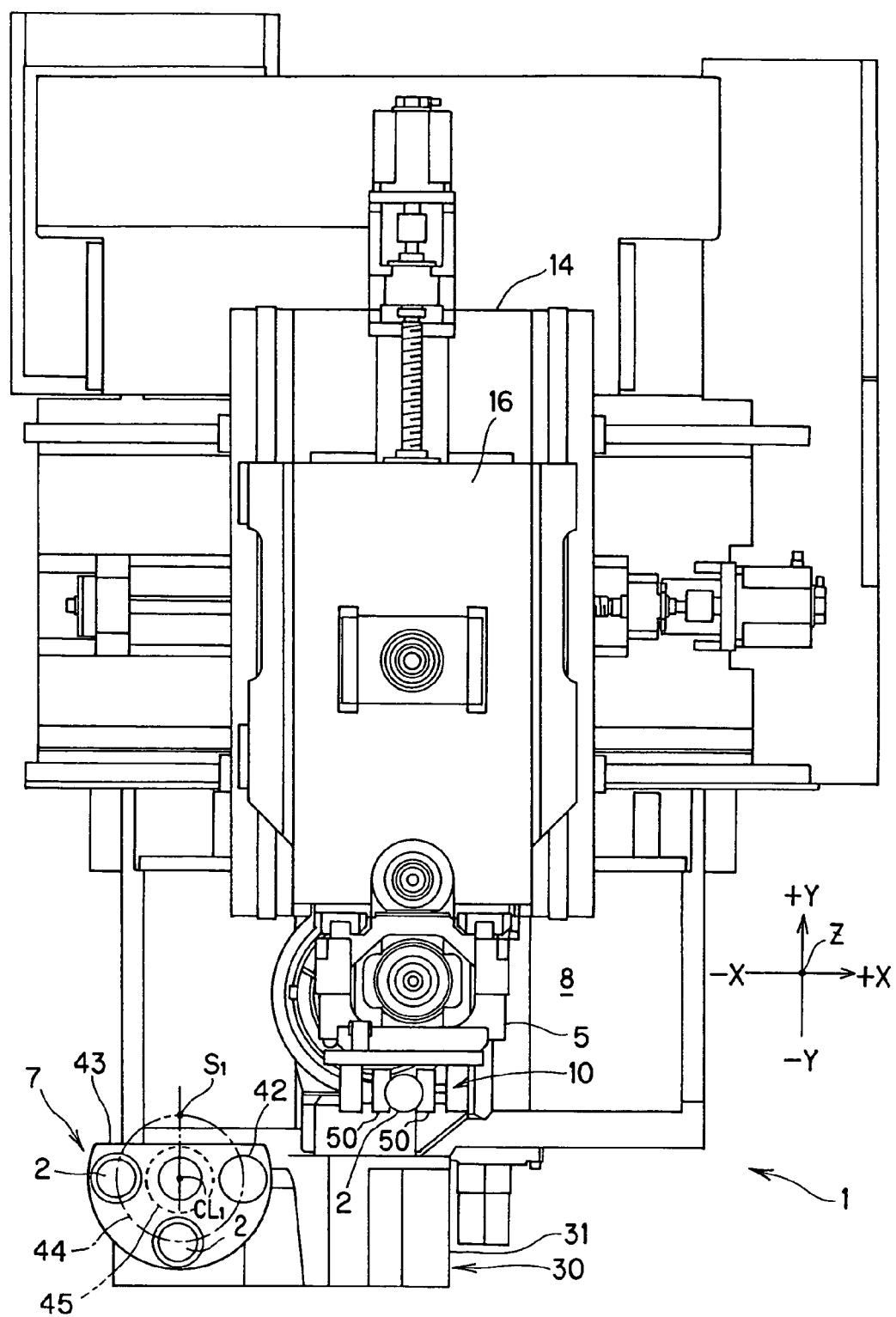

FIG. 1 and FIG. 2 are a perspective view and a plan view of a vertical machining center, respectively. FIGS. 3A to 3J are illustrations of the operations of the vertical machining center.

FIG. 1 and FIG. 2 show the vertical machining center (hereinafter referred to as MC) 1 according to this embodiment. This MC 1 is a machine tool which may perform at least turning to a bar workpiece 2 as a workpiece in a five-axis control.

The MC 1 is controlled by a controller 20 which is composed of an NC (numerical control) unit and a programmable logic controller (PLC). Incidentally, the controller 20 may be a controller in which the PLC portion is built in the NC unit.

An axis CL of a main spindle 3 of the MC 1 is directed in the vertical direction to a floor surface 4. Incidentally, the axis CL may be directed in a direction which is slanted at a predetermined angle to the vertical direction (also in this case, the direction is regarded as "the substantially vertical direction to the floor surface").

A spindle head 5 rotatably supports the main spindle 3. The spindle head 5 is movable in three mutually transverse axes directions (X-axis direction, Y-axis direction and Z-axis direction) relative to a workpiece (for example, a bar workpiece 2). A table 6 is arranged beneath the spindle head 5.

A direction parallel with the axis CL of the main spindle 3 is defined as a Z-axis (an axis in the up-and-down direction in FIG. 1) in the MC 1. Each axial direction for intersecting the Z-axis at right angles and for forming the mutually transverse axes is defined as an X-axis (an axis in the right-and-left direction in FIG. 2) and a Y-axis (an axis in the up-and-down direction in FIG. 2). Incidentally, for the sake of explanation, a −Y-axis direction, a +Y-axis direction, a +X-axis direction and a −X-axis direction are a forward direction, a backward direction, a rightward direction and a leftward direction of the MC 1, respectively.

A vertical stocker 7 which may stock at least one bar workpiece 2 in the vertical direction is disposed in the vicinity of a machining area 8 in the MC 1. The stocker 7 is also controlled by the controller 20.

The workpiece machined by the MC 1 is a bar workpiece having an axial dimension longer than a radial direction. For example, the bar workpiece (i.e., a bar member or a bar work) is a so-called "short member" in which the axial dimension is in the range of about 500 to 900 mm and the outside diameter dimension is less than about 100 mm.

In the MC 1, this bar workpiece is fed from the stocker 7. In the MC 1, after the machining operation such as turning by a turning tool and cutting by a rotating tool is finished, the bar workpiece is to be returned back to the stocker 7 as a machined bar workpiece.

Also, in some cases in the MC 1, the non-machined member (for example, chuck work) is fed to a chuck 11, and the turning operation or the cutting operation is finished, and then the workpiece is removed from the chuck 11 as the machined workpiece.

Thus, the MC 1 may perform the machining both the chuck workpiece (chuck work) and the bar workpiece 2 but the vertical machining center according to the present invention may be specialized exclusively for the machining operation of the bar workpiece.

In this embodiment, a so-called "cradle" type five-axis controlling MC 1 in which the table 6 is swung is shown as a machine tool. Incidentally, the "vertical machining center" according to the present invention also includes a vertical machine tool (for example, a turning center). This machine tool is a vertical machine tool in which a spindle head is movable in the three mutually transverse axes directions relative to the workpiece and the table is arranged in the lower side.

A hand portion 10 which may grip and release the bar workpiece 2 and which approaches the bar workpiece only in a horizontal direction is provided on the spindle head 5. The spindle head 5 moves between the stocker 7 and the table 6 so that the hand portion 10 transfers the bar workpiece 2. Also, the hand portion 10 performs putting and removing the bar workpiece 2 to the stocker 7 and the chuck 11 of the table 6, respectively.

As a result, in the MC 1, it is possible to perform the operations such as stocking, feeding and machining to the bar workpiece 2 in a space-saving manner even without a feeding device having a complicated structure for pushing the bar workpiece 2.

The structure of the MC 1 will now be described.

The MC 1 has a bed 13 forming a base 12 of the MC 1. A saddle 14 is movably provided on the base 12 in the X-axis direction (the right-and-left direction) by a guidance of X-axis guide rails 15.

A column 16 is movably provided on the saddle 14 in the Y-axis direction (the forward and backward direction) by the guidance of Y-axis guide rails 17. The spindle head 5 is provided in a front portion of the column 16.

The main spindle 3 is supported rotatably by the spindle head 5. The spindle head 5 is movable relative to the column 16 in the Z-axis direction (the up-and-down direction) in parallel with the axis CL of the main spindle 3 by the guidance of Z-axis guide rails 18.

The table 6 is supported by the bed 13 and is disposed below a level of the spindle head 5. The table 6 is driven to be swingable and to be also at least rotatable (in this case, both the rotational motion and the index motion) by a table drive unit 30.

The table 6 has the chuck 11 and is able to direct upwardly (+Z-axis direction) and positioned. The chuck 11 has a plurality (for example, three) of jaws 11a. The chuck 11 may grip and release the workpiece such as the bar workpiece 2 and the chuck workpiece.

An insertion hole 19 for inserting the bar workpiece 2 is formed in a central position of the table 6 and the chuck 11. The chuck 11 may be adapted to grip and release the bar workpiece 2 under the condition that the bar workpiece 2 is inserted into the insertion hole 19.

A chuck cylinder (not shown) for driving the jaws 11a of the chuck 11 is provided on the table 6. The plurality of jaws 11a of the chuck 11 are driven by the chuck cylinder to simultaneously perform the opening and closing operations to grip and release the bar workpiece 2 and the chuck workpiece.

The table drive unit 30 has a swing drive unit 31 for swinging the table 6 about a B-axis and a rotational drive unit 32 for rotating the chuck 11 about an A-axis and for indexing the chuck 11 relative to the table 6. The B-axis is in parallel with the Y-axis direction and the A-axis is a rotational center of the chuck 11 (i.e., a rotational center of the table 6).

The swing drive unit 31 is disposed in front of the MC 1 and supports both ends of the table 6 in a swingable manner. The rotational drive unit 32 is provided on the table 6. The swing drive unit 31 is driven so that the table 6, the rotational drive unit 32 and the like are swung about the B-axis and the table 6 is indexed at a predetermined position.

The rotational drive unit 32 is driven while the workpiece is turned. Then, the chuck 11 mounted on the table 6 may be rotated about the A-axis at predetermined rotational speeds. Also, while the workpiece is cut by the rotating tool, the rotational drive unit 32 is controlled to thereby make it possible to index the chuck 11 at a predetermined position about the A-axis.

Accordingly, the chuck 11 is rotated about the A-axis at predetermined rotational speeds under the condition that the bar workpiece 2 or the chuck workpiece is gripped by the chuck 11. Then, the workpiece is rotated and is subjected to turning by a turning tool 33 mounted on the main spindle 3.

In some cases, the chuck 11 is indexed at predetermined positions about the A-axis by the rotational drive unit 32. In those cases, the workpiece gripped by the chuck 11 may be cut by another rotating tool 33 mounted on the main spindle 3.

In the MC 1 with the structure described above, the spindle head 5 is movable in the three mutually transverse axes directions relative to the workpiece, such as the bar workpiece 2 and the chuck workpiece, gripped by the chuck 11 of the table 6. Also, the table 6 is driven by the table drive unit 30 to be able to make the swing motion and the rotational motion. Accordingly, the MC 1 may machine the workpiece in the five-axis control of the X-axis, Y-axis, Z-axis, A-axis and B-axis.

The MC 1 may perform turning by the turning tool and cutting by the rotating tool to the workpiece such as the bar workpiece 2 and the chuck workpiece. Thus, the numbers of kinds of the workpieces which may be machined by the MC 1 are increased. Also, a variety of kinds of machining to those workpieces may be performed so that the MC 1 may exhibit the versatility as a combined machine tool.

The stocker 7 is disposed in the vicinity of the table 6 and may stock the bar workpieces 2 in the vertical direction. In the specific embodiment, the number of the bar workpieces 2 which may be stocked in the stocker 7 is plural (three in this case) but it is possible to apply this exclusively to the single workpiece.

A receiving and discharging position S1, at which the bar workpiece 2 is received and discharged, is set on the stocker 7. The bar workpiece 2 may be received from the hand portion 10 provided on the spindle head 5 at the position S1 and may be discharged to the hand portion 10 at the position S1. The stocker 7 may index the bar workpiece 2 or an empty receiving sleeve 42 (to be described later) at the receiving and discharging position S1. The bar workpiece 2 is automatically received and discharged between the stocker 7 and the hand portion 10 at the receiving and discharging position S1.

The spindle head 5 moves between the table 6 and the receiving and discharging position S1 of the stocker 7. Thus, the hand portion 10 transfers the bar workpiece 2 and puts and removes the bar workpiece 2 out of the stocker 7 and the chuck 11 of the table 6.

Accordingly, it is unnecessary to provide a feeding device having a complicated structure for pushing the bar workpiece 2. Therefore, the structure of the stocker 7 is simplified. Also, the stocker 7 may be formed in a space-saving manner in plan view because the stocker 7 stocks the bar workpieces 2 in the vertical fashion. The MC 1 including the stocker 7 as a whole becomes compact to make it possible to perform the operations such as stocking, feeding and machining of the bar workpieces 2 in the space-saving manner.

The stocker 7 according to this embodiment is disposed by utilizing an upper space of the table drive unit 30. Incidentally, if an upper space of the base 12 may be utilized, the stocker 7 may be directly disposed in the upper space of the base 12.

Thus, there is a case in which a dead space in the upper portion of the table drive unit 30 or the upper portion of the base 12 has not been utilized. In this case, the upper space (dead space) is effectively utilized for the stocker 7 in the present invention. Accordingly, it is possible to dispose the stocker 7 as a whole (or substantially as a whole) in a footprint of the MC 1 in plan view to make it possible to save the space.

The stocker 7 has a stocker body 40, a swivel portion 41 and a plurality (three in this case) of receiving sleeves 42.

An index drive unit 45 for indexing the bar workpiece 2 at the receiving and discharging position S1 is provided on the stocker body 40. The stocker body 40 is fixed on a top surface of the swinging drive unit 31 for swinging the table 6. Also, the stocker body 40 is disposed on one side (left side in this case) of the B-axis in plan view.

The swivel portion 41 is mounted horizontally on an upper portion of the stocker body 40. The swivel portion 41 is composed of a semi-circular plate which is cut away linearly leaving the center of the circle. The swivel portion 41 may swivel about the swivel axis CL1 of its center.

When the stocker 7 is kept in the standby condition (the condition shown in FIG. 2), the linear cutaway surface 43 of the swivel portion 41 is adapted to be directed in parallel with the X-axis. Thus, when the MC 1 performs the machining operation, there is no fear that the moving portion such as the spindle head 5 would interfere with the swivel portion 41.

The plurality (three in this case) of receiving sleeves 42 are fixed on the top surface of the swivel portion 41 and are arranged to be directed upwardly in parallel with the swivel axis CL1. A reference circle 44 coaxially with the swivel portion 41 is set about the swivel axis CL1 in the stocker 7.

The receiving and discharging position S1 is positioned on the reference circle 44. The three receiving sleeves 42 are arranged to be directed upwardly on the swivel portion 41 so that the three receiving sleeves 42 are separated by 90 degrees to each other and their centers are positioned on the reference circle 44.

The receiving sleeve 42 is opened upwardly and forms a cylindrical shape or a bottomed cylindrical shape. When the bar workpiece 2 is moved in an up-and-down direction in parallel with the swivel axis CL1, it is possible to insert the bar workpiece 2 into the receiving sleeve 42 and to remove the bar workpiece 2 out of the receiving sleeve 42.

When the index drive unit 45 provided on the stocker body 40 is driven, the swivel portion 41 is swiveled about the swivel axis CL1. Thus, the receiving sleeve 42, in which a desired bar workpiece 2 is stocked, or the empty receiving sleeve 42 may be indexed at the receiving and discharging position S1 and be positioned in place.

Also, when the stocker 7 is brought into the standby condition, the index drive unit 45 is driven and then the swivel portion 41 is swiveled about the swivel axis CL1. Then, the linear cutaway surface 43 is directed in the right-and-left direction in parallel with the X-axis. Thus, there is no fear that the moving portion such as the spindle head 5 would interfere with the swivel portion 41, the receiving sleeves 42 and the bar workpieces 2 which are stocked.

The operations for feeding the non-machined bar workpiece 2 to the stocker 7 and for discharging the machined bar workpiece 2 out of the stocker 7 may be personally performed by the operator. Incidentally, it is preferable that a unit for suspending the bar workpieces 2 is provided and the setup and changing operation is performed by utilizing this unit because a load to be imposed to the operator is decreased.

The hand portion 10 is mounted on the front side of the spindle head 5 and is moved with the spindle head 5 in the three mutually transverse axes directions. In this embodiment, there is shown a case in which the hand portion 10 is mounted on a predetermined position of the spindle head 5. Incidentally, the hand portion 10 may be controlled so as to be moved in the Z-axis direction relative to the spindle head 5. Thus, it is possible to increase the raising and moving down speeds of the bar workpieces 2 and to shorten the time for receiving and discharging the bar workpiece 2.

The hand portion 10 has a pair of hands 50 for opening and closing simultaneously. The pair of hands 50 makes the opening and closing motions in the direction in parallel with the X-axis so that the bar workpiece 2 may be gripped and released. Therefore, at the receiving and discharging position S1, the hand portion 10 may insert and remove the bar workpiece 2 to the receiving sleeve 42 indexed at the receiving and discharging position S1.

At the position of the table 6, the hand portion 10 may put and remove the workpiece 2 to the chuck 11. Namely, in some cases, the chuck 11 of the table 6 is directed upwardly and the A-axis of the table 6 is indexed in parallel with the Z-axis and is positioned in place. At this time, the hand portion 10 performs inserting the bar workpiece 2 into the insertion hole 19 and informs drawing out the bar workpiece 2 out of the insertion hole 19 from above the table 6.

The spindle head 5 is moved in the three mutually transverse axes directions. Accordingly, the hand portion 10 transfers the bar workpiece 2 between the receiving and discharging position S1 and the table 6. Also, at the receiving and discharging position S1, the hand portion 10 may insert and remove the bar workpiece 2 to the receiving sleeve 42. Also, the hand portion 10 may be positioned above the table 6 and may put and remove the bar workpiece 2 to the table 6.

The machining area 8 is covered by a splash guard (not shown) so that the cutting fluid (coolant) and the chips may be prevented from splashing to an outside of the machining area 8. A shutter for changing the workpieces and a shutter for changing the tools are provided on the splash guard and may be opened and closed, respectively. These shutters are closed and opened so that the workpieces and the tools may be changed.

An automatic tool changer (hereinafter referred to as ATC and not shown) for receiving a plurality of tools and for changing the tools is provided on the base 12. The ATC has a function to index a desired tool (or an empty tool receiving portion) at the changing position and to automatically change the tools to the main spindle 3.

The rotating tools for cutting the workpieces such as the bar workpieces 2 or the chuck workpieces in addition to the turning tools (tools for boring, tools for facing and the like) for turning the workpieces 2 are stocked in the ATC. Incidentally, it is possible to provide a tool magazine, for stocking a plurality of tools, separately from the ATC.

The controller 20 has an operating board 21. A display means and an input means are provided on the operating board 21 so that the MC 1 and the stocker 7 may be operated. As the display means, there are provided a display, a CRT and the like, and as the input means, there are a key board, a touch panel and the like.

A coolant tank (not shown) for reserving the cutting fluid to be fed to a machining position is disposed in the vicinity of the bed 13.

The operations of the MC 1 and the stocker 7 will now be described with reference to FIGS. 1 to 3J.

Incidentally, FIGS. 3A to 3J show a case of steps shifting in order from a step shown in FIG. 3A to a step shown in FIG. 3J. An upper drawing and a lower drawing in each of FIGS. 3A to 3J show a schematic plan view and a schematic frontal views, respectively.

The case in which the non-machined bar workpieces 2 are stocked in two receiving sleeves 42 out of the three receiving sleeves 42 of the stocker 7 at the operation start of the MC 1 as shown in FIG. 3A will now be described.

When a changing command of the bar workpieces 2 is outputted by the controller 20, the MC 1 and the stocker 7 start the changing operations of the bar workpieces 2 on the basis of the this command. Then, the pair of hands 50 is kept under the open condition and the jaws 11a of the chuck 11 are also kept under the open condition.

Also, the swing driving unit 31 is driven to thereby swing the table 6 to direct the chuck 11 upwardly and then the A-axis keeps in parallel with the Z-axis. The index drive unit 45 of the stocker 7 is driven to swivel the swivel portion 41. The non-machined bar workpiece 2 to be machined is indexed at the receiving and discharging position S1 and is positioned in place.

The spindle head 5 is moved in the three mutually transverse axes directions through the saddle 14 and the column 16 as shown in FIG. 3B. Thus, the center position of the hand portion 10 is moved from above the table 6 to the receiving and discharging position S1.

At this time, if the spindle head 5 is moved from the backside to the front side in the vicinity of the receiving and discharging position S1, there is no fear that the moving portion such as the hand portion 10 would interfere with the bar workpiece 2. Incidentally, the spindle head 5 may be moved down straightly in the Z-axis direction after the hand portion 10 is located above the bar workpiece 2 at the receiving and discharging position S1. This is more preferable because the fear that the hand portion 10 would interfere with the bar workpiece 2 becomes less.

Thus, the hands 50 are closed to grip the bar workpiece 2 under the condition that the center position of the hand portion 10 is identified with the receiving and discharging position S1 as shown in FIG. 3C.

Subsequently, when the spindle head 5 is raised in the Z-axis direction as shown in FIG. 3D, the bar workpiece 2 is drawn away from the receiving sleeve 42. Thereafter, the spindle head 5 is moved from the receiving and discharging position S1 to the upper position of the chuck 11 to transfer the bar workpiece 2 by the hand portion 10.

The spindle head 5 is moved down straightly in the Z-axis direction under the condition that the center position of the hand portion 10 is identified with the center position of the chuck 11 as shown in FIG. 3E. On the other hand, the swivel portion 41 is swiveled in the opposite direction to stand by.

A lower portion of the bar workpiece 2 gripped by the hand portion 10 is inserted into the insertion hole 19 of the chuck 11 as shown in FIG. 3F. Then, under the condition that the spindle head 5 is stopped in a predetermined height position, the jaws 11*a* of the chuck 11 are closed and the hands 50 are opened.

Thus, the bar workpiece 2 is gripped by the chuck 11 and simultaneously therewith is released from the gripping of the hand portion 10. The spindle head 5 is raised straightly in the Z-axis direction under this condition because the bar workpiece 2 is gripped only by the chuck 11.

When the spindle head 5 is raised to a predetermined level as shown in FIG. 3G, the spindle head 5 is stopped. The jaws 11*a* of the chuck 11 are opened to discharge the bar workpiece 2 after the hands 50 have been closed and the bar workpiece 2 has been gripped by the hands 50. Thus, the bar workpiece 2 comes to be gripped only by the hand portion 10. Under this condition, the spindle head 5 is moved down straightly in the Z-axis direction again.

When the spindle head 5 is moved down to a predetermined height position as shown in FIG. 3H, the spindle head 5 is stopped. Thereafter, the jaws 11*a* of the chuck 11 are closed and the bar workpiece 2 is again gripped by the chuck 11, and then the hands 50 are opened and release the bar workpiece 2 from the gripping.

Thereafter, the spindle head 5 is raised straightly in the Z-axis direction until the hands 50 are located above the level of the upper end of the bar workpiece 2 and are separated away from the bar workpiece 2. Incidentally, in the case in which the axial dimension of the bar workpiece 2 is long, it is sufficient to repeat the operations to re-gripping the bar workpiece 2 by the chuck 11 and the hands 50.

Thus, the bar workpiece 2 is transferred to the machining step under the condition that the workpiece 2 is gripped by the chuck 11 as shown in FIG. 3I. For this purpose, the swing drive unit 31 is driven so that the table 6 is swung about the B-axis. Thus, the center axis CL2 of the bar workpiece 2 is shifted from the up-and-down direction (direction in parallel with the Z-axis) to a horizontal direction (direction in parallel with the X-axis) and is positioned in place.

Then, as shown in FIG. 3J, the chuck 11 is rotated by the rotational drive unit 32, and the bar workpiece 2 is rotated at predetermined rotational speeds. The spindle head 5 is moved in the two mutually transverse axial directions (or the three mutually transverse axes directions). Thus, the bar workpiece 2 may be turned and machined by the turning tool 33 mounted on the main spindle 3.

Incidentally, the tools are changed to the main spindle 3 by the ATC in the case in which another kind of turning is performed to the bar workpiece 2 by the turning tool or in the case in which the cutting is performed to the bar workpiece 2 by the rotating tool.

In the case in which the cutting is performed by the rotating tool, the rotational drive unit 32 is driven to position and fix the chuck 11 under the condition that the chuck 11 is indexed in a predetermined position in the circumferential direction. Thus, the bar workpiece 2 is indexed in a predetermined angular position under the condition that the bar workpiece 2 is gripped by the chuck 11.

Then, the rotating tool mounted on the main spindle 3 is rotated at predetermined rotational speeds. The bar workpiece 2 is cut by the rotating tool while the spindle head 5 is moved in the three mutually transverse axes directions relative to the bar workpiece 2 gripped by the chuck 11.

Thus, in the MC 1, it is possible to continuously and automatically perform the cutting and turning to the bar workpiece 2 in order as desired.

Incidentally, when the swing drive unit 31 is driven, it is possible that the bar workpiece 2 is indexed under the conditions that the bar workpiece 2 is kept in a slanted direction in addition to the horizontal direction to thereby make it possible to perform various turning and cutting and turning operations in a predetermined desired manner.

On the other hand, the stocker 7 is kept in the standby condition until a next bar workpiece changing command is provided.

The turning and the cutting for the single bar workpiece 2 are completed and then a command for changing the machined bar workpiece 2 to the next non-machined bar workpiece 2 is outputted. Then, the machined bar workpiece 2 is returned back to the stocker 7 in the opposite steps and operations to the above-described steps and operations. Thereafter, the bar workpieces are changed by the same steps and operations as the above-described steps and operations and then the next non-machined bar workpiece 2 is to be machined. Such steps and operations are repeated to thereby perform the turning and cutting for the bar workpieces 2 in order.

On the other hand, in the stocker 7, after the operator has removed the machined bar workpiece 2, the operator performs the setup and change work for feeding the non-machined bar workpiece 2 to the stoker 7.

As described above, the MC 1 has the structure which may position the table 6 upwardly. Accordingly, it is possible to put and remove the bar workpieces 2 to the table 6 while the bar workpiece 2 is directed vertically. As a result, the vertical stocker 7 may be provided to thereby make it possible to stock the bar workpieces 2 in the vertical direction.

The stocker 7 may stock the bar workpieces 2 in the vertical direction and has a small footprint in plan view. Accordingly, it is possible to arrange the stocker 7 on the upper space of the table drive unit 30 or the upper space of the base 12. Thus, since the above-described upper spaces which are likely to be a dead space may be effectively utilized, the MC 1 as a whole is made compact in plan view to save the space.

The embodiment of the present invention has been described. However, the present invention is not limited to the above-described specific embodiment. It is possible to make various modifications and additions within the scope of the invention.

For example, in the above-described embodiment, the invention is applied to the machine tool having the structure in which the spindle head 5 is moved in the three mutually transverse axes directions. However, the invention is not limited to this. It is possible to use a structure in which the spindle head is moved in the two mutually transverse axes directions (for example, Z-axis direction and Y-axis direction), the lower table is moved in the single axes direction (for example, X-axis direction), and the stocker is provided on the machine body. In this case, the receiving and discharging position is located on the front face of the spindle head, and the movements for receiving and discharging the bar workpiece between the spindle head and the stocker are able to be performed in the Y-axis direction and the Z-axis direction.

Incidentally, the same reference numerals are used to indicate the same or corresponding components or members throughout the drawings.

What is claimed is:

1. A vertical machining center having a table arranged below and a spindle head being movable in three mutually transverse axes directions relative to a workpiece, said vertical machining center comprising:
    a vertical stocker, which is disposed in the vicinity of a machining area, for stocking a bar workpiece in a vertical direction; and
    said spindle head provided with a hand portion which approaches the bar workpiece only in a horizontal direction and grips and releases the bar workpiece,
    wherein said spindle head moves between said stocker and said table so that said hand portion transfers the bar workpiece and performs putting and removing the bar workpiece to said stocker and a chuck of said table, respectively.

2. A five-axis controlling vertical machining center in which an axis of a main spindle rotatably supported by a spindle head is directed in a substantially vertical direction to a floor surface,
    a table having a chuck adaptable to be directed upwardly, the table being disposed below a level of the spindle head,
    said spindle head is movable in three mutually transverse axes directions relative to a workpiece gripped by the chuck, and said table is driven to be swingable and to be also at least rotatable by a table drive unit, said vertical machining center comprising:
    a vertical stocker, which is disposed in the vicinity of the table, for stocking at least one bar workpiece in a vertical direction; and
    said spindle head provided with a hand portion which approaches the bar workpiece only in a horizontal direction and grips and releases the bar workpiece,
    wherein said spindle head moves between said table and a receiving and discharging position of said stocker so that said hand portion transfers the bar workpiece and performs putting and removing the bar workpiece to said stocker and the chuck of said table, respectively.

3. The vertical machining center according to claim 2, wherein said table drive unit comprises: a swing drive unit for swinging said table; and a rotational drive unit for rotating the chuck and for indexing the chuck relative to the table, wherein said swing drive unit for supporting both ends of the table in a swingable manner is disposed in front of said vertical machining center, and said table is provided with said rotational drive unit, and said table and said rotational drive unit are swung and indexed at a predetermined position by driving said swing drive unit.

4. The vertical machining center according to claim 3, wherein when the rotational drive unit is driven while the bar workpiece is turned, the chuck mounted on the table is rotated at predetermined rotational speeds, and while the bar workpiece is cut by a rotating tool, the rotational drive unit is controlled to thereby index the chuck at a predetermined position.

5. The vertical machining center according to claim 3, wherein when the swing drive unit is driven, the bar workpiece is indexed under the conditions that the bar workpiece is kept in a slanted direction in addition to the horizontal direction to thereby make it possible to perform various turning and cutting operations in a predetermined desired manner.

6. The vertical machining center according to claim 2 wherein an insertion hole for inserting the bar workpiece is formed in a central position of the table and the chuck, and the chuck is adapted to grip and release the bar workpiece under the condition that the bar workpiece is inserted into the insertion hole.

7. The vertical machining center according to claim 2, wherein the stocker stocks a plurality of bar workpieces and is disposed by utilizing an upper space of a base of said vertical machining center or an upper space of the table drive unit so that the bar workpiece is indexed at the receiving and discharging position.

8. The vertical machining center according to claim 7, wherein said stocker comprises: a stocker body provided with an index drive unit for indexing the bar workpiece at the receiving and discharging position; a swivel portion, for swiveling about a swivel axis, mounted horizontally on an upper portion of said stocker body; and a plurality of receiving sleeves fixed on a top surface of said swivel portion and arranged to be directed upwardly in parallel with the swivel axis, wherein the receiving sleeve is opened upwardly and forms a cylindrical shape or a bottomed cylindrical shape, and the bar workpiece is moved in an up-and-down direction in parallel with the swivel axis so that it is possible to insert the bar workpiece into the receiving sleeve and to remove the bar workpiece out of the receiving sleeve.

9. The vertical machining center according to claim 8, wherein said swivel portion is composed of a semi-circular plate which is cut away linearly leaving a center of the circle, and when the stocker is brought into the standby condition, the index drive unit is driven and then the swivel portion is swiveled about the swivel axis and a linear cutaway surface of the swivel portion is directed in a right-and-left direction so that there is no fear that the spindle head would interfere with the swivel portion, the receiving sleeves and the bar workpieces which are stocked.

10. The vertical machining center according to claim 8, wherein the index drive unit provided on the stocker body is driven so that the swivel portion is swiveled about the swivel axis, accordingly an empty receiving sleeve or the receiving sleeve, in which the desired bar workpiece is stocked, is indexed at the receiving and discharging position and is positioned in place.

11. The vertical machining center according to claim 6, wherein at the receiving and discharging position, the hand portion inserts and removes the bar workpiece to the receiving sleeve indexed at the receiving and discharging position, and when the chuck of the table is directed upwardly and the table is indexed and positioned in place, the hand portion inserts the bar workpiece into the insertion hole and draws the bar workpiece out of the insertion hole from above the table.

12. The vertical machining center according to claim 2, wherein said vertical machining center performs turning and cutting the bar workpiece and a chuck workpiece other than the bar workpiece.

13. A vertical machining center having a table arranged below and a spindle head being movable in three mutually transverse axes directions relative to a workpiece, said vertical machining center comprising:
 a vertical stocker, which is disposed in the vicinity of a machining area, for stocking a bar workpiece in a vertical direction; and
 said spindle head provided with a hand portion which grips and releases the bar workpiece at a position near a center of the bar workpiece,
 wherein said spindle head moves between said stocker and said table so that said hand portion transfers the bar workpiece and performs putting and removing the bar workpiece to said stocker and a chuck of said table, respectively.

14. A five-axis controlling vertical machining center in which an axis of a main spindle rotatably supported by a spindle head is directed in a substantially vertical direction to a floor surface,
 a table having a chuck adaptable to be directed upwardly, the table being disposed below a level of the spindle head,
 said spindle head is movable in three mutually transverse axes directions relative to a workpiece gripped by the chuck, and said table is driven to be swingable and to be also at least rotatable by a table drive unit, said vertical machining center comprising:
 a vertical stocker, which is disposed in the vicinity of the table, for stocking at least one bar workpiece in a vertical direction; and
 said spindle head provided with a hand portion which grips and releases the bar workpiece at a position near a center of the bar workpiece,
 wherein said spindle head moves between said table and a receiving and discharging position of said stocker so that said hand portion transfers the bar workpiece and performs putting and removing the bar workpiece to said stocker and the chuck of said table, respectively.

* * * * *